June 5, 1945. C. D. RYAN ET AL 2,377,522
MAIL TREATING MACHINE
Filed Oct. 1, 1941 8 Sheets-Sheet 1

INVENTORS
COMMODORE D. RYAN,
EDWARD P. DRAKE,
BY Blair, Curtis & Hayward
ATTORNEYS.

June 5, 1945.  C. D. RYAN ET AL  2,377,522
MAIL TREATING MACHINE
Filed Oct. 1, 1941    8 Sheets-Sheet 3

INVENTORS
COMMODORE D. RYAN,
EDWARD P. DRAKE,
BY Blair, Curtis & Hayward
ATTORNEYS.

June 5, 1945.    C. D. RYAN ET AL    2,377,522
MAIL TREATING MACHINE
Filed Oct. 1, 1941    8 Sheets-Sheet 4

INVENTORS
COMMODORE D. RYAN,
EDWARD P. DRAKE,
BY Blair, Curtis & Hayward
ATTORNEYS.

June 5, 1945.　　C. D. RYAN ET AL　　2,377,522
MAIL TREATING MACHINE
Filed Oct. 1, 1941　　8 Sheets-Sheet 5
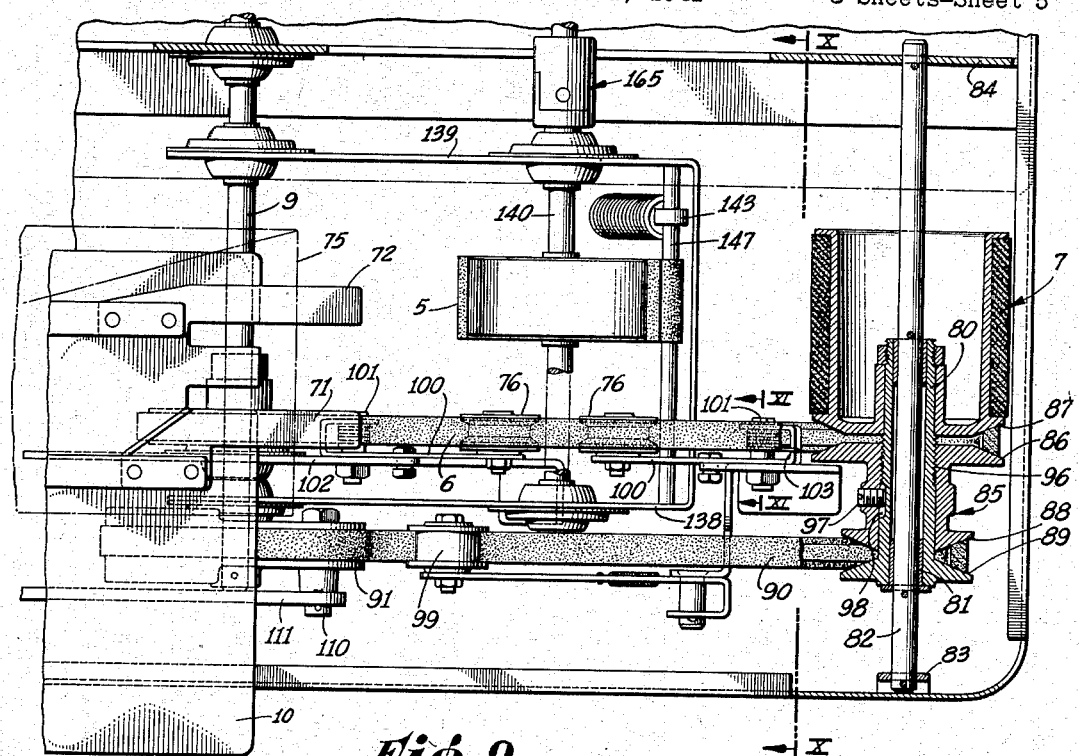
Fig. 9.
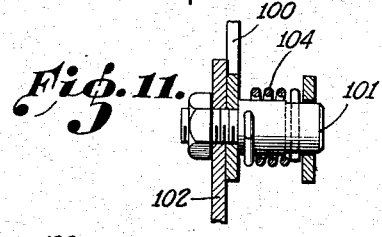
Fig. 11.
Fig. 10.
INVENTORS
COMMODORE D. RYAN,
EDWARD P. DRAKE,
BY Blair, Curtis & Hayward
ATTORNEYS.

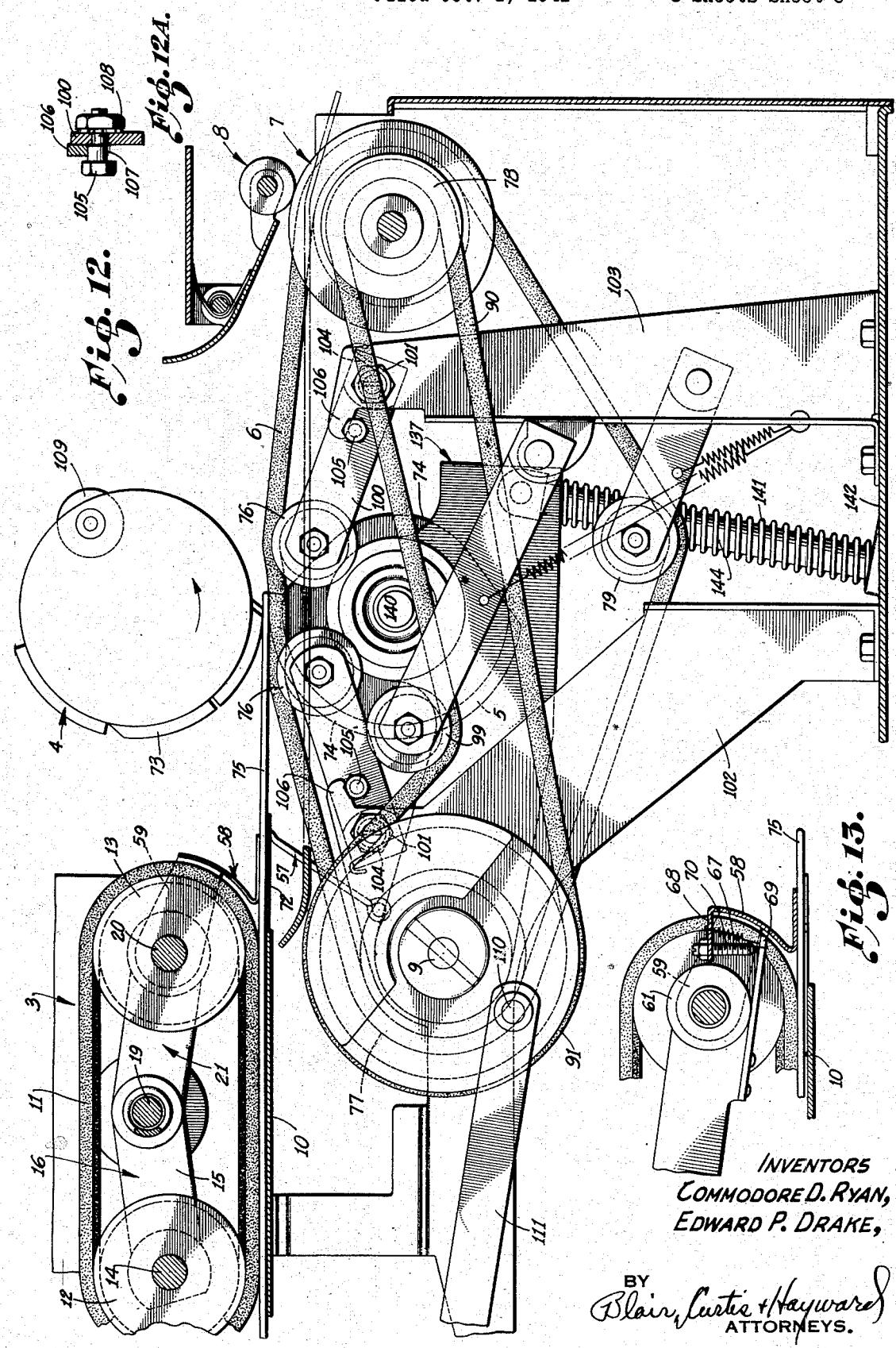

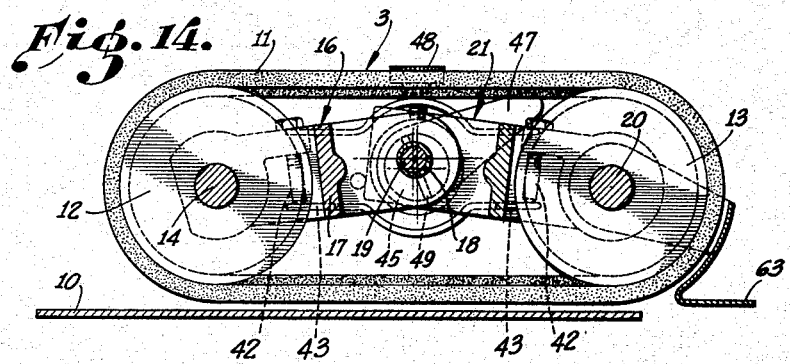
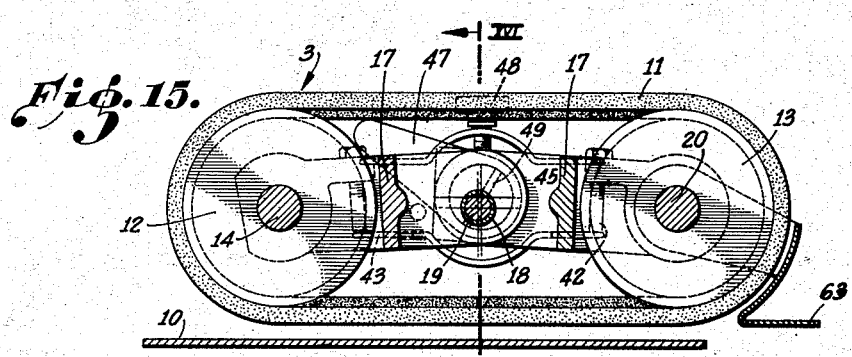
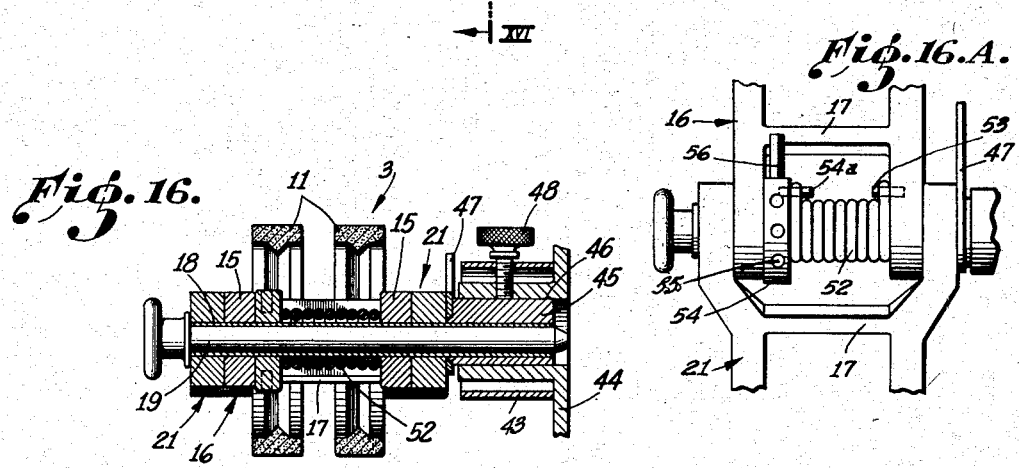
INVENTORS
COMMODORE D. RYAN,
EDWARD P. DRAKE,
BY Blair, Curtis + Hayward
ATTORNEYS.

June 5, 1945.     C. D. RYAN ET AL     2,377,522
MAIL TREATING MACHINE
Filed Oct. 1, 1941     8 Sheets—Sheet 8
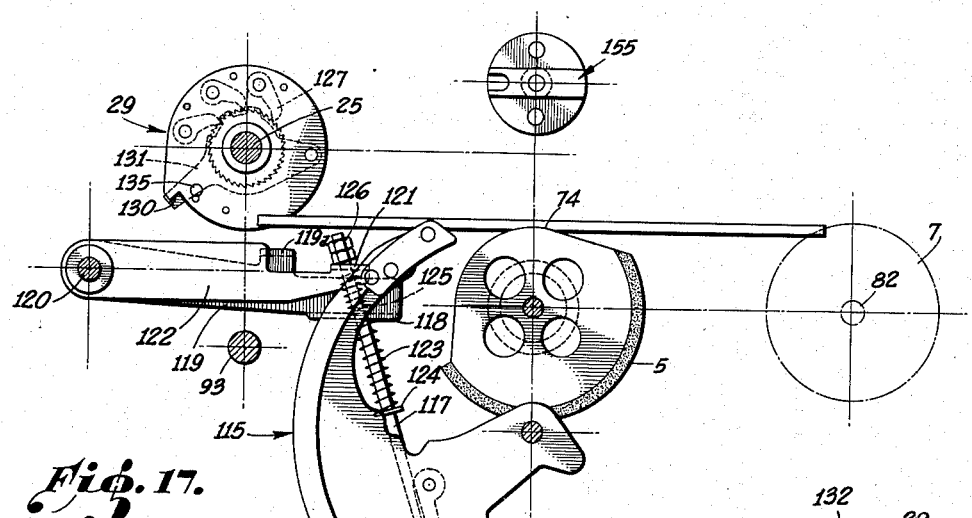
Fig. 17.
Fig. 19.
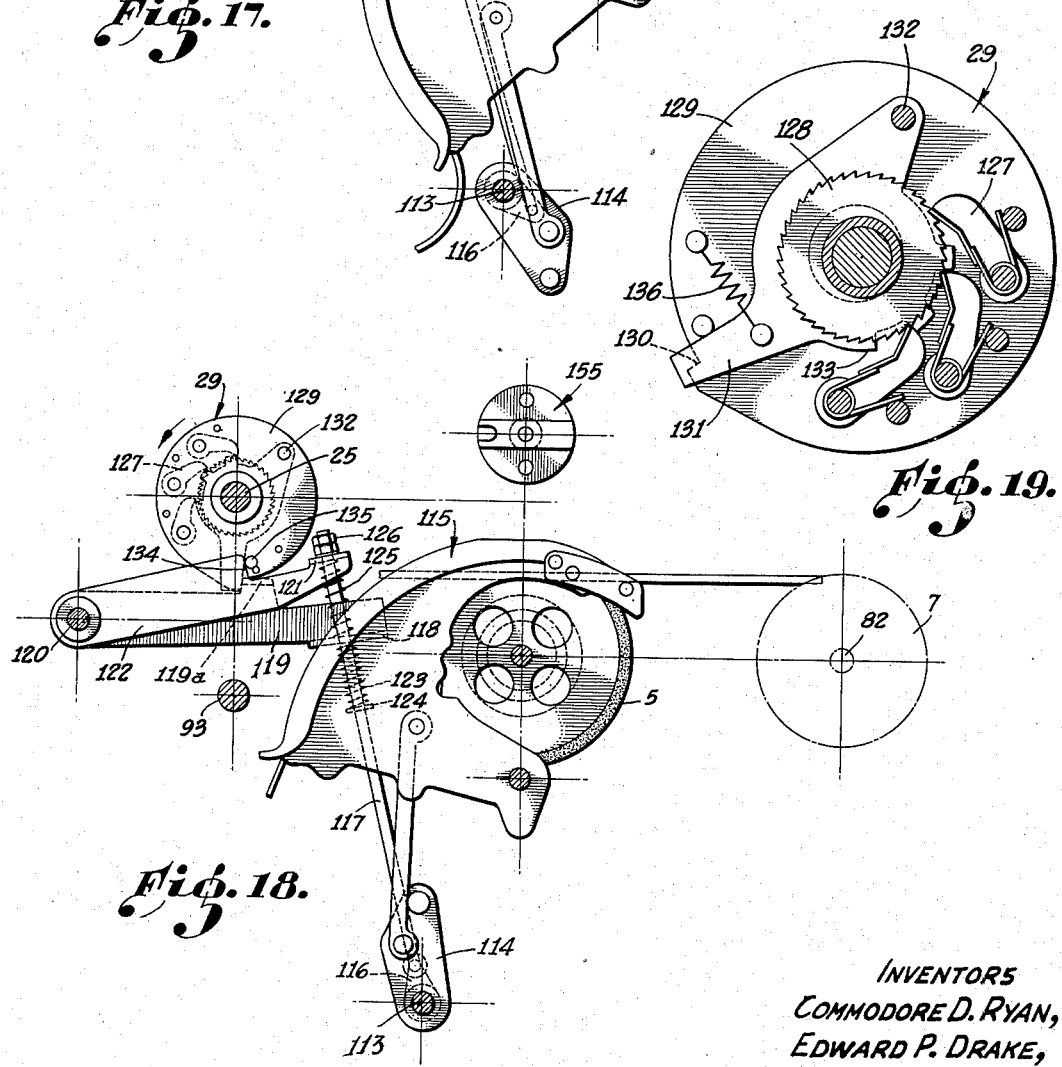
Fig. 18.
INVENTORS
COMMODORE D. RYAN,
EDWARD P. DRAKE,
BY Blair, Curtis + Hayward
ATTORNEYS.

Patented June 5, 1945

2,377,522

UNITED STATES PATENT OFFICE 2,377,522

MAIL TREATING MACHINE

Commodore D. Ryan and Edward P. Drake, Los Angeles, Calif., assignors to Commercial Controls Corporation, a corporation of Delaware Application October 1, 1941, Serial No. 413,120

21 Claims. (Cl. 101—235)

This invention relates to automatic machines for successively treating small objects, and is particularly useful in postage printing machines adapted either to print postage on envelopes, cards, and the like, or on adhesive tape, which is then attached to bulky objects, such as parcel post packages.

An object of the invention is to simplify, reduce the cost of manufacture, increase the life, increase the reliability, and reduce maintenance expense of machines of the type referred to.

Another object of the invention is to reduce the friction and thereby reduce the power required to operate machines of the type described.

A more specific object is to provide a mail treating machine capable of printing postage either on letters or on tape, which is particularly quiet, and economical as to power requirements, when printing on tape.

Other more specific objects and features of the invention will become apparent from the detailed description to follow, of a particular embodiment of the invention.

Mail treating machines of the type to which this invention particularly relates comprise, as essential elements, a feed hopper for holding a stack of mail to be treated, a feed mechanism for delivering mail from the hopper one piece at a time, passing it through the machine and ejecting it, printing mechanism for stamping postage on the mail during movement thereof through the machine, and, finally, a tape-supplying and handling mechanism for delivering tape to the printing mechanism, in lieu of mail, at the option of the operator.

The printing mechanism in machines of this type comprises a rotary printing head, which constitutes a part of a postage metering mechanism, and a rotary printing platen for compressing the mail against the printing head.

Both the conveying mechanism and the printing mechanism are driven, through a suitable transmission, from an electric motor, the feeding mechanism usually operating continuously to automatically successively feed envelopes from the hopper one at a time, and the printing mechanism being operated intermittently in response to movement of each envelope thereto. The intermittent operation of the printing mechanism is effected by a clutch interposed between the electric motor and the printing mechanism, which clutch is engaged by a trigger in the path of the mail as it moves toward the printing mechanism.

As heretofore constructed, machines of this type have been relatively bulky, have required considerable power to operate them, and have been unnecessarily noisy and wasteful of power when printing on tape, or when running mail through without printing on it (as when sealing envelopes only).

One reason for the excessive power consumption of the prior machines when delivering envelopes without printing on them has been that they have employed circumferentially continuous printing heads and printing platens urged together by a relatively heavy spring mechanism in order to produce the requisite pressure for good printing. This required a relatively powerful and positive power feed for positively entering mail between the printing head and platen. Despite the fact that this high pressure is not at all necessary when envelopes are being fed through the machine without being printed upon, the same pressure was always applied. This defect of prior machines is eliminated, in accordance with the present invention, by engaging the envelope between the printing platen and printing head only while actually printing, and employing an auxiliary, light pressure, feeding mechanism, in place of the platen, for feeding envelopes through the printing position when they are not to be printed upon.

In the prior machines it has been necessary to operate at least a portion of the conveyor system when printing on tape, even though the conveyor system proper did not act on the tape, because the printing platen was driven as a unit with the conveying mechanism. In the present machine the driving mechanism of the conveying system is segregated completely from that of the printing head and platen, so that the entire conveying system can be stopped when printing on tape. This reduces the noise, the wear and tear, and the power consumption when printing on tape.

The manner in which we obtain other advantages over the prior machines, will appear from the following detailed description.

In the drawings:

Fig. 9 is a plan view, partly in section, with some parts removed, and showing a portion of the conveyer system;

Fig. 10 is a vertical section, taken in the plane X—X of Fig. 9;

Fig. 11 is a detail, vertical section taken in the plane XI—XI of Fig. 9;

Fig. 12 is an enlarged front elevation view of a portion of the conveyer system;

Fig. 12a is a section of an eccentric stop employed in the machine;

Fig. 13 is a detail, vertical section of a small portion of the conveyer system shown in Fig. 12, the section being taken in a plane in front of the plane of Fig. 12;

Fig. 14 is a vertical sectional view of the feed conveyer in position for handling thin mail;

Fig. 15 is a view similar to Fig. 14 but showing the conveyer adjusted for handling thick mail;

Fig. 16 is a detail cross-section in the plane XVI—XVI of Fig. 15;

Fig. 16a is a detail plan view of a portion of the feed conveyer;

Fig. 17 is a skeleton view showing the tape mechanism in retracted position;

Fig. 18 is a skeleton view showing the tape mechanism in active position; and

Fig. 19 is a detail section taken in the plane XIX—XIX of Fig. 5.

Figure 1:
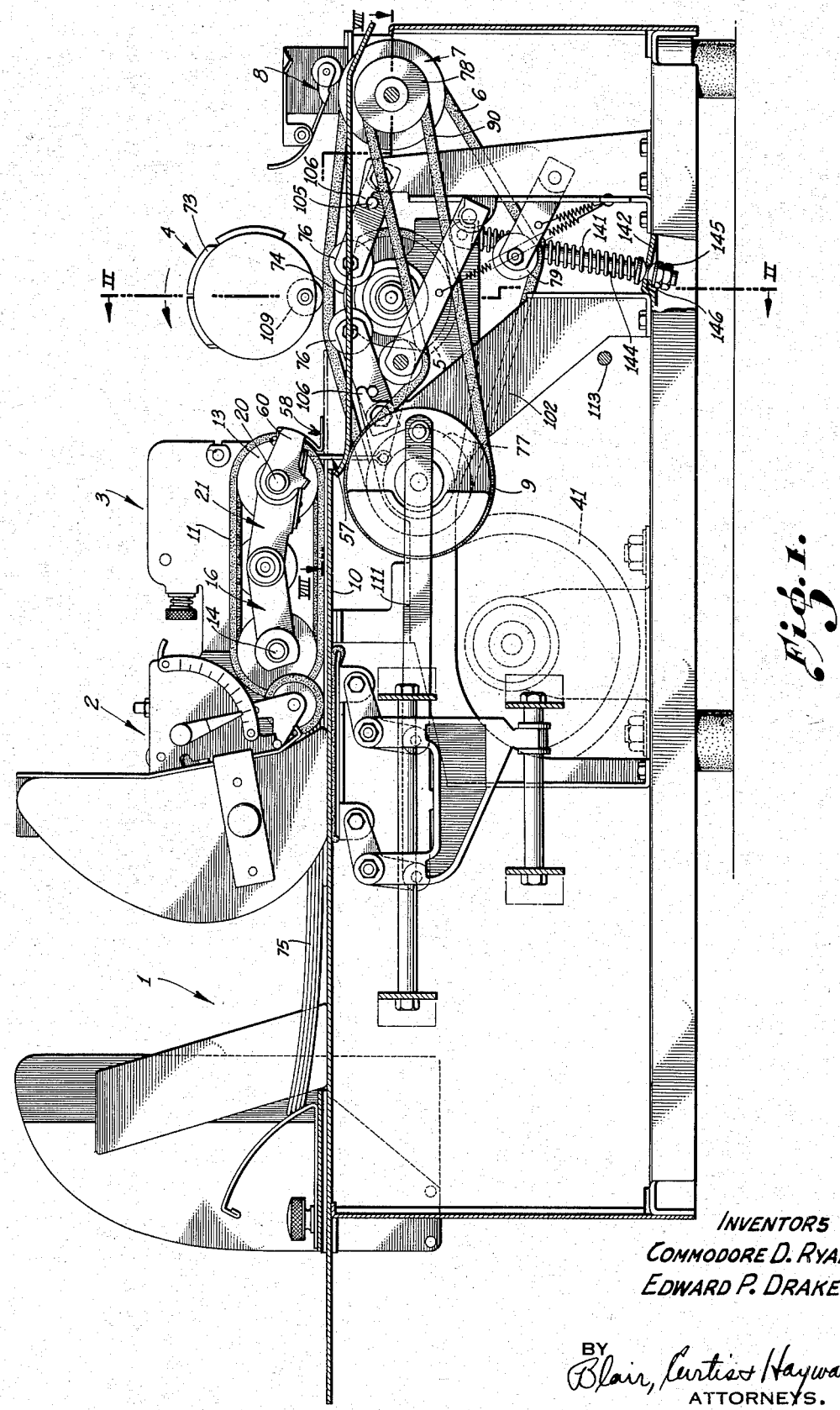
Fig. 1 is a front elevation of a mailing machine in accordance with the invention, with the front portion of the casing broken away.

The following is a description of certain features of the mail treating machine shown in Figure 1, namely, the feed conveyer system, certain aspects of the tape feeding mechanism, and certain aspects of the meter drive. Other aspects of this machine are particularly described in certain copending applications as follows:

Commodore D. Ryan and Edward P. Drake, Serial No. 399,324, filed June 23, 1941, which is directed to the envelope trip and the mechanism controlled thereby.

Commodore D. Ryan, Serial No. 388,770, filed April 16, 1941, which is directed to apparatus for the handling of envelopes and the like.

Commodore D. Ryan, Serial No. 363,257, filed October 29, 1940, which is directed to mechanism which feeds envelopes and the like one at a time into the mail treating machine for treatment thereof.

Commodore D. Ryan and Edward P. Drake, Serial No. 413,121, filed October 1, 1941, which is directed primarily to the control system of the mailing machine for adjusting the machine either for stamping postage on envelopes or on tape.

Commodore D. Ryan and Edward P. Drake, Serial No. 413,122, filed October 1, 1941, which is directed to the envelope guiding, and part of the envelope feeding mechanism of the mail treating machine.

Referring first to Fig. 1, the mailing machine incorporating the improvements of the present invention comprises a feed hopper 1 for containing a stack of envelopes or other objects to be treated, a feeding and stripping mechanism 2 for delivering objects one at a time from the feed hopper 1, and a feed conveyer 3 for receiving objects from the feeding and stripping mechanism 2 and delivering them to a printing mechanism, the latter comprising as its essential elements a printing head 4 and a printing platen 5. An auxiliary conveyer 6 facilitates the feeding of the envelopes past the printing head and platen and to an ejector roller 7 which ejects the printed envelopes from the machine. The objects are held against the ejector roller 7 by a pressure roller assembly 8.

The exact construction of the hopper 1 and the feeding and stripping mechanism 2 does not constitute a part of the present invention. It may be constructed in accordance with the disclosure in the copending application of Sager et al., Serial No. 332,305, filed April 29, 1940, on Mail treating machine, or, preferably in accordance with the above-noted application of Commodore D. Ryan and Edward P. Drake, Serial No. 413,122, filed October 1, 1941, entitled Apparatus for feeding articles to a mail treating machine. Suffice it to say at this point that the feeding and stripping mechanism is driven from the power plant of the machine through a transmission that will be fully described later.

*Feed conveyer system*

The feeding and stripping mechanism 2 slides the bottom envelope from the hopper 1 along a table 10 below a pair of feed conveyer belts 11, which are stretched between a pair of double pulleys 12 and 13, respectively, the pulley 13 being power-driven.

Figures 4, 5, 5A:
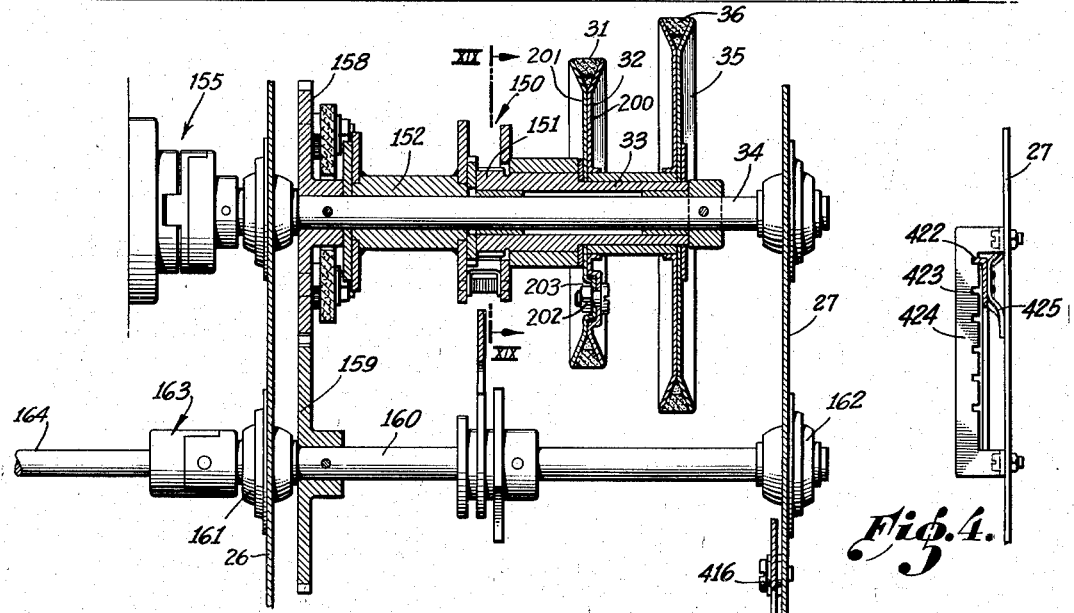
Fig. 4 is a detail, vertical section, taken in the plane IV—IV of Fig. 3.
Fig. 5 is a vertical section taken in the plane V—V of Fig. 3.
Fig. 5a is an enlarged detailed section taken along the curved line Va—Va of Fig. 3.

The double pulley 12 is secured to a shaft 14, the opposite ends of which are rotatably supported in journals in arms 15 of an H-shaped rocker arm 16, the two arms 15 being interconnected by a cross member 17 (Figs. 14 and 15). The other ends of the arms 15 are journaled on a sleeve 18 (Fig. 16), which sleeve is detachably supported on the frame of the machine by a pin 19. The other double pulley 13 is similarly mounted on a shaft 20 which is rotatably supported in journals in an H-shaped member 21 similar to the member 16, and pivotally supported at its other end on the sleeve 18. The shaft 20 projects rearwardly beyond the H-shaped member 21 (Fig. 6) and has secured at its rear end a universal coupling 22 which connects it to a connecting shaft 23. This shaft 23 extends rearwardly (Fig. 2) and at its rear end is connected by a second universal coupling 24 to a shaft 25, which is journaled in walls 26 and 27 of the machine. Referring to the skeleton view of Fig. 6, the shaft 25 has pinned thereto the driven element 28 of a clutch 29 having a drive element 30 which includes a pulley driven by a belt 31. The belt 31 is driven by a pulley 32 (Fig. 3), which pulley is secured to a sleeve 33 (Fig. 5), which is freely rotatable on a shaft 34. The effective diameter of pulley 32 is adjustable for timing the conveying system of the machine to the printing head of the meter, all as will be more fully described hereinbelow. Also secured to the sleeve 33 is a pulley 35, which is driven by a belt 36, which in turn is driven by a pulley 37 (Fig. 6), which is freely rotatable on shaft 25, but is rigidly secured to and driven by a pulley 38, the latter being in turn driven by a belt 39 from a variable diameter pulley 40 on an electric motor 41.

The speed of operation of the entire machine may be varied between limits by varying the diameter of the pulley 40 and this is accomplished by varying the tension of the belt 39 by shifting an idler pulley 410 (Fig. 3) mounted on an arm 411 pivotally supported at its lower end on a shaft 412. Pivotally connected to the arm 411 is a link 413 which link extends through an aperture provided therefor in an ear 414 on one arm of a bellcrank lever 415 fulcrumed at one end 416 to the frame of the machine. The ear 414 is held between a fixed stop 417 on the link 413 and a washer 418, which washer is urged toward the collar 417 by a helical spring 419 compressed between the washer 418 and a cross pin 420 in the left end of the link 413. The bellcrank lever 415 has a long arm 421 constituting a control handle and adapted to be held in any one of a plurality of adjustable positions by engagement of a knife edge 422 (Fig. 4) in one of a plurality of notches 423 in a stationary guide 424. A flat spring 425 on the arm 422 bears against the frame member 27 and yieldably maintains the knife edge 422 in whichever one of the notches 423 it may have been placed.

Summarizing, the feed conveyer belts 11 are driven at an adjustable speed from the electric motor 41 through the clutch 29.

The H-shaped rocker members 16 and 21 can be swung upward or downward at their outer ends to vary the elevation of the pulleys 12 and 13 and thereby vary the distance between the lower stretches of the conveyer belts 11 and the table 10, to adapt the conveyer for handling envelopes of different thickness. To this end, each of the rocker members 16 and 21 has on its rear arm a fulcrum screw 42 (Fig. 14) the lower end of which rests on a shelf 43 secured to a stationary bracket 44 (Fig. 16), on which bracket the pin 19 is movably supported in an eccentric sleeve to be described later. By raising or lowering the pin 19, the inner ends of the rocker arms 16 and 21 can be raised or lowered, rocking the rocker arms about the lower ends of the pins 42, and thereby lowering or raising the pulleys 12 and 13 to vary the clearance between the conveyer belts and the table 10.

The pin 19 can be manually raised or lowered by rotating the eccentric sleeve 45 (Fig. 16). Thus the sleeve 45 is rotatably mounted in a journal 46 in the bracket 44, so that by rotating the sleeve 45 from the position shown in Figs. 15 and 16 into the position shown in Fig. 14 the pin 19 can be raised from a lower position to an upper position. To facilitate manual rotation of the eccentric sleeve 45, it has secured thereto a handle arm 47 which extends upwardly past the end of the bracket hub in which the eccentric sleeve is journalled. When the sleeve is adjusted into its desired position of rotation, it is locked by tightening a thumbscrew 48 threaded in the hub of bracket 44, the inner end of the screw bearing against the eccentric sleeve 45. Furthermore, the eccentric sleeve 45 is split at 49, as shown in Fig. 15, so that by tightening the screw 48 the sleeve is not only locked against rotation, but is also compressed about the pin 19 to lock the latter in place.

The outer ends of the H-shaped members 16 and 21 are constantly urged downwardly by a torsion spring 52 (Figs. 16 and 16a) which surrounds the sleeve 18 between the two arms 15 of the H-shaped member 16. The rear end of the spring is hooked around a pin 53 on the rocker arm 16, and the front end of the spring is hooked around a pin 54a on a ring 54 which is rotatably mounted on the sleeve 18. The ring 54 has a plurality of radial holes 55 therein, in one of which there is positioned a pin 56 which rests against the cross member 17 of the H-shaped rocker arm 16. The tension of the spring 52 can be adjusted by rotating the ring 54 counterclockwise and placing the pin 56 in a suitable one of the holes 55.

The spring 52 normally maintains the fulcrum screws 42 (Fig. 14) against the shelf 43. However, when mail, which is slightly thicker than the clearance between the belts 11 and the table 10, is fed through the machine, the spring 52 yields to permit the rocker arms to move upwardly and carry the fulcrum screws 42 clear of the shelf 43. As soon as the mail has passed the conveyer, the rocker arms are restored to their previous position of adjustment by the spring 52.

The clearance between the conveyer belts and the table 10 can be very accurately adjusted to accommodate mail of different thickness by rocking the handle 47. This easy and accurate adjustment of the clearance is highly desirable, as it reduces the time the machine is idle, for adjustments, and encourages the operator to always keep the machine in best adjustment for the particular mail being handled. With the proper adjustment, the fulcrum screws 42 are barely lifted clear of the shelf 43 as the mail passes through.

Figure 2:
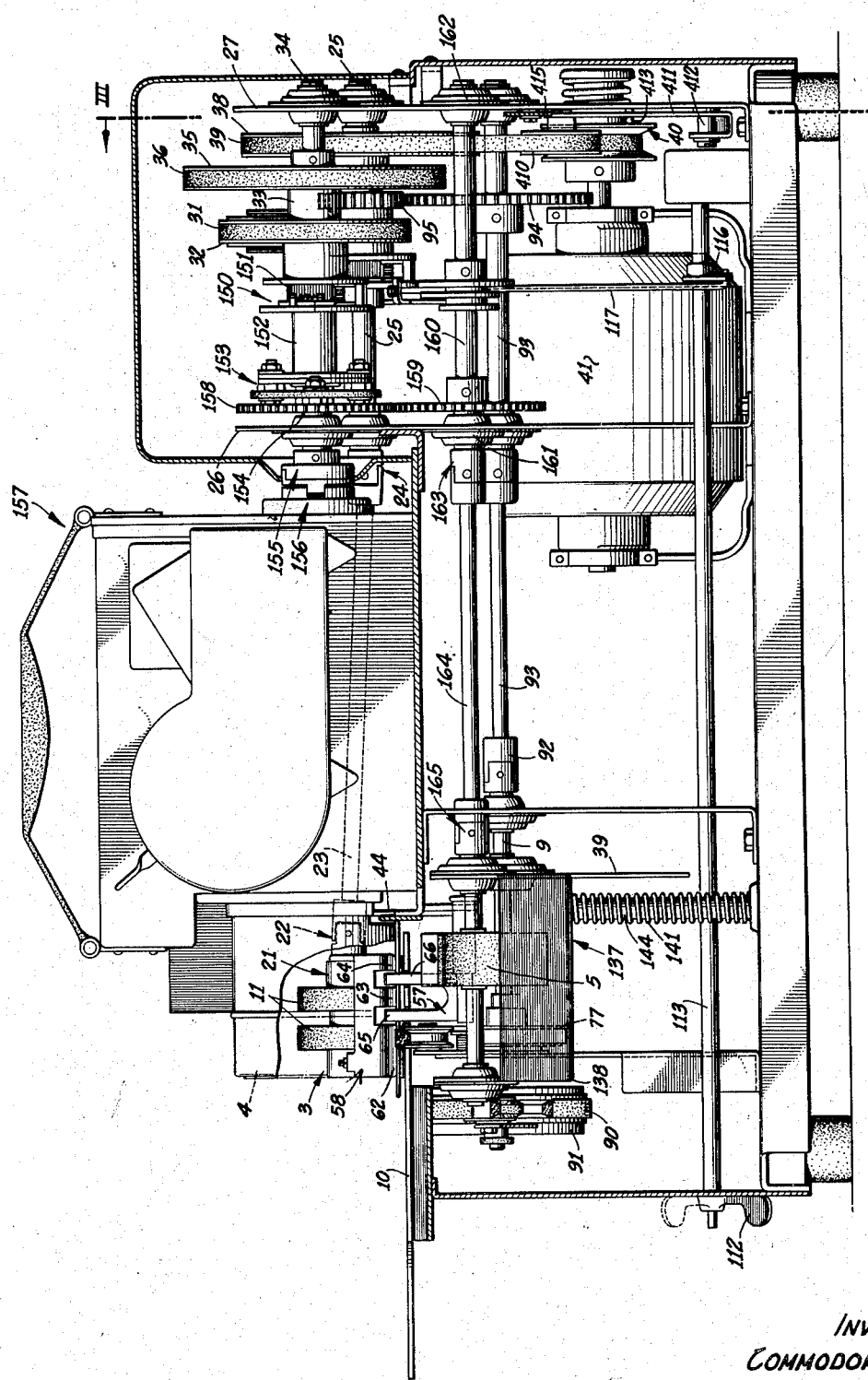
Fig. 2 is a vertical section, taken in the plane II—II of Fig. 1.

As mail passes out from between the conveyer belts 11 and the table 10, it moves between lower and upper guides that support it against vertical deflection while it trips a trigger 57 which, as shown in Fig. 1, normally extends vertically into the path of the mail. The upper guide consists of a yoke 58 (Figs. 1 and 13), the side arms 59 and 60 of which are pivotally supported on the bearing bushing 61 of the rocker member 21, for swinging movement. Secured to the yoke member are three relatively stiff leaves or fingers 62, 63 and 64 (Fig. 2). The space between the two leaves 62 and 63 is aligned with the space between the two conveyer belts 11, 11, and accommodate a front trigger arm 65 of the trigger 57. The space between the two leaves 63 and 64 is located immediately back of the rear conveyer belt 11, and accommodates a rear arm 66 of the trigger 57.

As shown in Fig. 2, the undersurfaces of the fingers 62, 63 and 64 normally lie in the plane of the undersurface of the belts 11, and the fingers are yieldably held in this position by a tension spring 67 (Fig. 13), which is stretched between a lug 68 on the yoke 58 and an arm 69 on the right rocker member 21. Downward movement of the yoke 58 in response to the spring 67 is limited by engagement of a stop screw 70 (on the yoke 58) against the arm 69. When the machine is acting upon mail of the thickness for which it is adjusted, the stop screw 70 remains against the arm 69. However, if thicker mail is fed through the machine, it may bear against the fingers 62, 63 and 64 with sufficient force to elevate the yoke 58 against the force of spring 67, and carry the stop screw 70 away from the arm 69, as shown in Fig. 13.

The lower guide, which cooperates with the fingers 62, 63 and 64 to support the mail as it moves past the trigger arms 65 and 66, comprises two relatively thin and flexible steel leaves 71 and 72 (Figs. 9 and 12), which are positioned below the fingers 62 and 64, respectively. The reason for providing the rockably mounted fingers 62, 63 and 64 and the flexible leaves 71 and 72, is to support relatively thin and flexible mail in the proper path for actuation of the trigger arms 65 and 66; they would not be necessary if relatively stiff, thick mail were always handled. The pivotal mounting of the upper fingers 62, 63 and 64 permits them to yield relative to the conveyer as thick mail passes out from under the conveyer. This prevents the fingers 62, 63 and 64 from applying excessive pressure to the mail. Such excessive pressure might impede the free movement of the mail toward the printing head.

The reason for making the lower leaves 71 and 72 relatively thin and flexible is to permit mail to be deflected slightly downward toward the printing head as it leaves the table 10. The necessity of this will be realized by remembering that the table 10 is in a plane substantially tangential to the printing surface of the printing head, and that the latter is unyieldably supported. When mail enters between the printing head and platen, the platen is depressed, and the mail has to bend downward as it leaves the table 10. This bending action is relatively slight with mail of slight thickness, as illustrated in Fig. 12, but is proportionately greater with thick mail.

The conveyer belts 11 function to deliver envelopes between the printing head 4 and the platen 5, which operate cyclically. When they are at rest, the printing head 4 and the platen 5 are in the positions shown in Fig. 1, in which the printing face 73 of the printing head is uppermost, and in which a cutaway portion 74 of the printing platen is uppermost, and there is substantial clearance between the printing head and platen for entry of an envelope. However, as each envelope passes and deflects the trigger 57, the latter engages a clutch (to be described later) to apply power to rotate the printing head 4 and the platen 5 in opposite directions, and by the time the envelope reaches them they have rotated to engage it therebetween, as shown in Fig. 12. Continued rotation of the printing head and platen carries the envelope therethrough by frictional engagement therewith. Thereafter the envelope is engaged between the ejector roller 7 and the pressure roller assembly 8 and ejected from the machine.

The ejector roller 7 is driven as follows:

Referring to Fig. 9, the roller 7 is mounted on a sleeve 80, which in turn is rotatably mounted by bushings 81 on a shaft 82, which is stationarily supported in wall members 83 and 84. There is also mounted upon the sleeve 80 a member 85 which has a conical face 86 at one end cooperating with a conical face 87 on the ejector roller 7 to form a V-pulley which supports and drives the auxiliary conveyer belt 6. On its other end, the member 85 has a conical face 88, which cooperates with a conical face 89 of a flange on the forward end of the sleeve 80 to form a V-pulley engaging a driving belt 90. The latter is driven from a pulley 91 secured to the shaft 9, which shaft (Fig. 6) is coupled by a universal joint 92 to a shaft 93, which in turn is driven through gears 94 and 95 from the shaft 25, previously referred to.

As previously described, the conveyer belts 11 are also driven from shaft 25, so the conveyer belts 11 and the pulley 91 operate at fixed relative speeds and in opposite directions. However, the speeds of the ejector roller and the auxiliary conveyer belt 6 can be varied by inversely varying the effective diameters of the two pulleys on the sleeve 80. Thus by moving the member 85 (Fig. 9) forwardly, the pulley faces 87 and 86 are separated to thereby reduce the effective diameter of the pulley driving the belt 6, while at the same time moving the face 88 closer to the face 89 to increase the diameter of the pulley engaging the belt 90, and reduce its speed.

To permit accurate longitudinal adjustment of the member 85 on the sleeve 80, the two parts are secured together with screw threads 96, and the member 85 is provided with a lockscrew 97 engageable with a longitudinal groove 98 in the sleeve 80 for locking the two parts against rotation. The adjustable member 85 permits of accurate adjustment of the linear speed of the auxiliary conveyer belt 6, so that is can be made equal to the peripheral speed of the printing face 73. A spring-actuated idler pulley 99 bears against the upper reach of the belt 90 to maintain it taut, despite variations in the diameter of the pulley it drives. Likewise, a spring-actuated idler pulley 79 engaging the lower reach of the auxiliary conveyer belt 6 maintains the latter taut despite variations in the diameter of its driving pulley.

Figure 6:
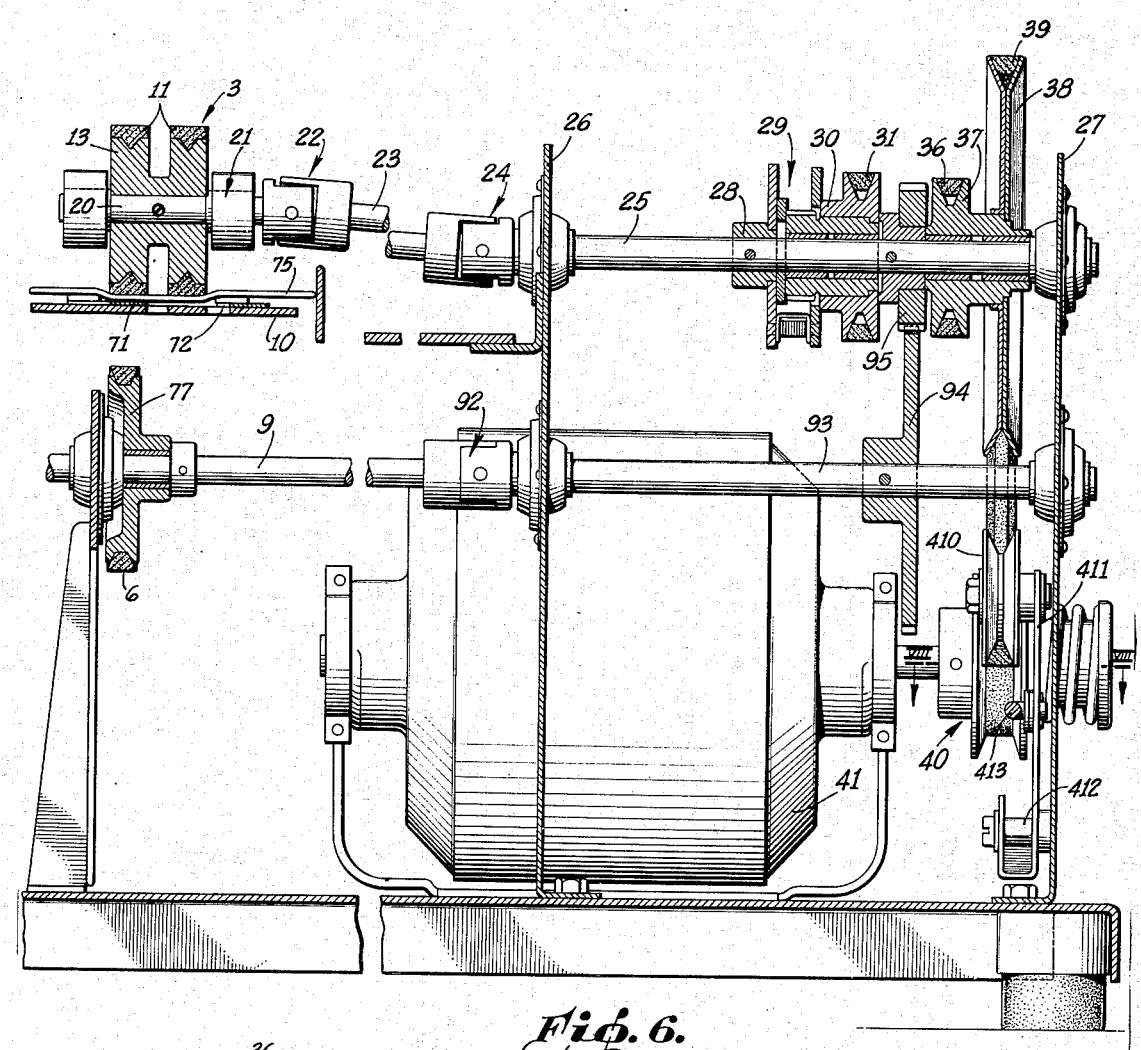
Fig. 6 is a vertical section taken in the plane VI—VI of Fig. 3.
Figure 7:
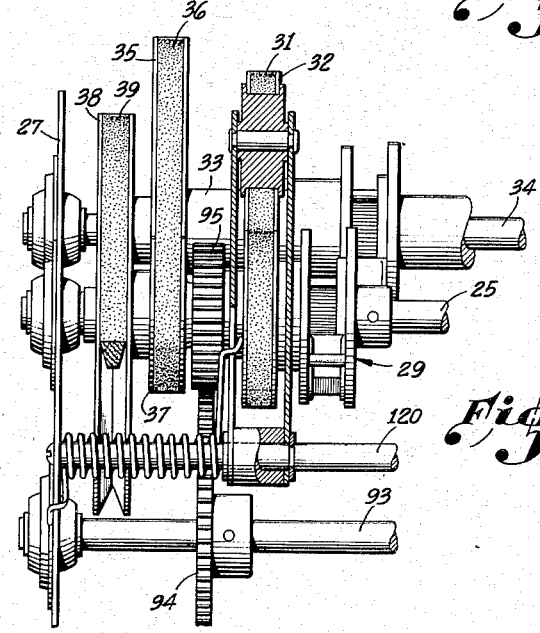
Fig. 7 is a detail, vertical section taken in the plane VII—VII of Fig. 3.
Figure 8:
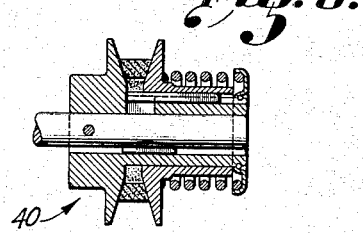
Fig. 8 is a detail, horizontal section taken in the plane VIII—VIII of Fig. 6.

The pulley 77, which supports the auxiliary conveyer belt 6 at its rear end, is freely rotatably mounted on the shaft 9, as indicated in Fig. 6.

As shown to best advantage in Fig. 10, the platen 5 engages an envelope 75 near one margin thereof, since the platen must be juxtaposed to the printed area of the envelope, and it is customary to print postage closely adjacent the upper longitudinal edge of an envelope. Therefore the driving contact of the printing head and the platen is applied to the envelope near the one edge thereof. However, it is desirable to also apply a driving force to the envelope at another point nearer its opposite edge, to aid the feeding action of the platen and printing head. It is also desirable to be able to feed envelopes past the printing head when the latter is not operated, as when envelopes are run through the machine to be sealed without being stamped (it being understood that the present machine may have a sealing mechanism incorporated therein adjacent the conveyer belt 11, although such a structure has been omitted from the present drawings to simplify them).

The auxiliary conveyer belt 6 performs the two functions mentioned. Thus, as clearly shown in Fig. 10, it is positioned in front of the platen 5 and has its upper reach yieldably supported by a pair of idler pulleys 76, to engage with the undersides of envelopes thereabove. The pulleys 76 are spaced apart longitudinally, so that one is in front of (with respect to the direction of travel of the belt 6) and the other is in back of the vertical plane through the axes of the printing head and the platen, respectively. They are rotatably supported on the free ends of a pair of arms 100, which are pivotally supported at their opposite ends on pivot screws 101 in stationary frame brackets 102 and 103, respectively. Each arm 100 is urged upward by a torsion spring 104 (Fig. 11) encircling its pivot screw, and has its upward movement limited by an adjustable stop 105 (Fig. 1) thereon, which stop is adapted to abut against a cooperating stationary shoulder 106 on the associated supporting bracket (Fig. 12a). Each adjustable stop member 105 consists of a bolt secured to the associated arm 100, and having an eccentric hub 107 which contacts the shoulder 106. The rear end face of the eccentric hub portion 107 is clamped against the front face of the associated arm 100 to hold it in a position of adjustment. Adjustment is effected by loosening the nut 108 on the bolt, rotating the latter to raise or lower the associated pulley 76 into the desired position, and then tightening the nut 108.

When properly adjusted, the pulleys 76 support the upper surface of the belt 6 substantially in the horizontal contact plane between the printing head and platen, so that the upper surface of the belt is pressed against envelopes fed between the printing head and platen, to apply a feeding force thereto aiding the feeding force applied to the rear edge of the envelope by the printing face 73, and insuring that the envelope will be fed straight, without skewing.

As shown in Fig. 12, mail depresses the belt 6 and the pulleys 76, against the force of the springs 104, carrying the eccentric stop members 105 away from the shoulders 106. In Fig. 12 the envelope has just begun to enter between the printing head and platen and only the leading pulley 76 has been depressed by the envelope.

The belt 6 may be a V-belt of conventional construction made of rubberized fabric, with a soft rubber coating on its outer face to increase the friction between the belt and the envelopes.

When the machine is operated to seal envelopes without printing on them, the platen and printing head remain in their neutral positions in which (Fig. 1) an idler roller 109 on the printing head is positioned above the auxiliary conveyer belt 6 in between (with respect to the direction of travel of the belt) the two idler pulleys 76, and functions to hold the envelopes down against the belt 6, which then constitutes the only means for conveying the envelopes after they leave the conveyer belt 11 and until they reach the ejector roller 7.

Heretofore it has been the practice to employ a circumferentially continuous platen, and to rotate it during sealing operations. The use of the belt 6 for feeding the envelopes below the roller 109 during sealing operations, requires substantially less power, because the upward spring forces exerted by the pulleys 76 on the belt 6 is much less than the upward spring force applied to the platen 5, which latter force must be sufficient to produce a good printed impression from the printing head and is much greater than is necessary to produce feeding contact with the envelopes when sealing only.

The platen is supported for movement toward and away from the printing head in a carriage 137 which includes a pair of side frame members 138 and 139 (Fig. 10) in which the platen shaft 140 is journaled. The frame members 138 and 139 are rockably supported on the shaft 9 (Fig. 1). The platen is urged upwardly by a compression spring 141 compressed between the base plate 142 of the machine and an eye 143 on the upper end of a guide rod 144, which guide rod extends through the spring 141 (to laterally support it) through an aperture in the base 142. The lower end of the rod 144 is threaded to receive a nut and locknut assembly 145, which limits upward movement of the rod 144. A washer 146 having a spherical lower face is interposed between the base plate 142 and the lower end of the spring 144. The eye 143 on the upper end of the rod 144 encircles a cross shaft 147 extending between the side member 138 and 139 of the carriage so that the carriage moves upwardly or downwardly with the rod 144.

It will be observed from an inspection of Fig. 9 that the outer radius of the belt 6 on the pulley defined by the faces 86 and 87 is less than the radius of the ejector roller 7. This makes the peripheral speed of the ejector roller greater than the peripheral speed of the belt 6, and insures that the envelopes will be carried away by the ejector roller at least as fast as they feed past the printing head, which thereby prevents any possibility of the envelopes being buckled between the printing head and the ejector roller.

*Driving system for the feed conveyers and the printing head*

One way in which the present machine differs from prior machines of the same general type is that whereas previously the printing platen constituted a part of the conveyer system and was at all times driven with the rest of the conveyer system, in the present machine the conveyer system is capable of being driven independently of the printing platen, and the latter is permanently coupled to the printing head so that it rotates when, and only when the printing head rotates. Thus as the conveyer system is capable of being driven independently of the printing platen, it is also capable of being driven independently of the printing head of the meter. Thus, as will be described, it is necessary to time the conveyer system to the printing head.

It has been previously pointed out that the conveyer belts 11 (Fig. 1) are driven by the shaft 20 (Fig. 2), which is driven through the universal coupling 22, the shaft 23, and the universal coupling 24 from the shaft 25. It has also been pointed out that the shaft 25 has a gear 94 (Fig. 6) meshing with gear 95 on the shaft 93, which is coupled by universal joint 92 to the shaft 9 carrying the pulley 77, which drives the ejector roller and the auxiliary conveyer belt 3.

The pulley 91 on shaft 9 (Fig. 9) has a crank 110 driving a connecting rod, which (Fig. 1) drives the stripper mechanism 2, which as previously stated strips the envelopes from the hopper 1 and delivers them to the conveyer belt. The particular construction of the stripper mechanism is of no moment in connection with the present invention, and the drive for it is mentioned only to bring out that the entire mechanism for feeding or conveying envelopes through the machine is driven from the shaft 25 (Figure 6) and is under the control of the clutch 29, which couples the shaft 25 to the driving pulley 30.

The clutch 29 is always engaged to drive the conveyer system whenever the machine is operating on envelopes, whether to print postage on them, or seal them, or perform both operations. However, the machine is also equipped to print postage on tape for attachment to bulky objects of irregular shapes, such as parcel post, and when the tape-printing mechanism is being used, the conveyer system is stopped, by disengaging the clutch 29. This is an important feature of the invention, since it reduces the power consumption and wear when printing on tape.

The machine is converted from condition for treating envelopes to condition for printing on tape, by rocking a control handle 112 (Fig. 2) on the front of the machine counterclockwise from the full line to the dotted line position shown in Fig. 2. This control handle 112 is secured to the forward end of a shaft 113 which carries an arm 114 (Fig. 17) for controlling the position of a tape chute 115, and an arm 116 for controlling the clutch 29. When the shaft 113 is in clockwise position, for letter operation, as shown in Fig. 17, the arm 114 is in lower position, in which it has pulled the tape chute 115 into a lower or inactive position. Likewise the arm 116 is in lower position in which it has pulled a link 117 downward.

The upper end of the link 117 extends through an aperture provided therefor in an ear 118 on the end of an arm 119 fulcrumed on the shaft 120, and also through an ear 121 on a second arm 122 also fulcrumed on the shaft 120, alongside the arm 119. A helical compression spring 123 surrounds the link 117 and is compressed between the ear 118 and a stop 124 on the link. Likewise another helical compression spring 125 is compressed between the ear 118 and the ear 121. An adjustable nut and locknut assembly 126 on the upper end of link 117 limits upward movement of the ear 121 with respect to the link.

When the controls are set for letter operation, as shown in Fig. 17, the arms 119 and 122 are clear of the clutch 29, and the latter is engaged. Thus, under these conditions (Fig. 19), one of a plurality of pawls 127 on the driven clutch element 28 engages a ratchet wheel 128 on the driving element 30 of the clutch, so that the driving element drives the driven member. However, when the control is thrown into position for printing on tape, as shown in Fig. 18, the arm 119 is moved into upper position in which a lip 119a thereon rides against a disc 129 on the driven member 28, which disc has a shoulder 130, which is engaged by the lip 119a to stop the driven member. Slightly before the shoulder 130 contacts the lip 119a, a clutch release lever 131 is engaged by the lip 119a to release the pawls 127 from the ratchet wheel 128. Thus, as shown in Fig. 19, the lever 131 is fulcrumed at 132 on the disc 129, and when rocked counterclockwise (with reference to Fig. 19 only) shoulders 133 on the lever 131 engage the pawls 127 and carry them clear of the ratchet wheel 128. This pawl-disengaging action is completed before the shoulder 130 engages the lip 119a. The function of the arm 122 is to prevent rebound of the driven clutch member after release thereof. Thus at the time of clutch-disengagement, as shown in Fig. 18, a shoulder 134 drops back of a pin 135.

The details of the tape chute do not constitute a part of the present invention, and will not be described herein. They are fully disclosed in the copending application of Ryan et al., Ser. No. 369,570, filed December 11, 1940. Suffice it to say that when the tape chute is in the upper position shown in Fig. 18, it is operated to deliver tape in response to rotation of the printing head and platen. When it is in the inactive position shown in Fig. 17, it is clear of the printing head and platen and does not affect the operation thereof.

As has been previously indicated, the printing head and platen are driven in unison with each other independently of the conveyer mechanism. They are driven from the same electric motor 41 that drives the conveyer system, but through a separate clutch 150. This clutch 150 (Fig. 2) is of the same general construction as the clutch 29, having a driving member 151 and a driven member 152. The driving member 151 is secured to the hub 33 (Fig. 5) of the pulley 35 which, as previously mentioned, is driven by the belt 36 from the motor 41 at all times.

The driven member 152 is connected, by an anti-shock coupling 153, to a shaft 154, which is journaled in the frame plate 26 (Fig. 2) and carries on its forward end a coupling member 155 adapted to engage a cooperating coupling member 156 on the postage meter 157. The postage meter rotatably supports and drives the printing head 4 in a manner fully described in the copending application of Sager et al., Ser. No. 332,305, previously referred to.

Figure 3:
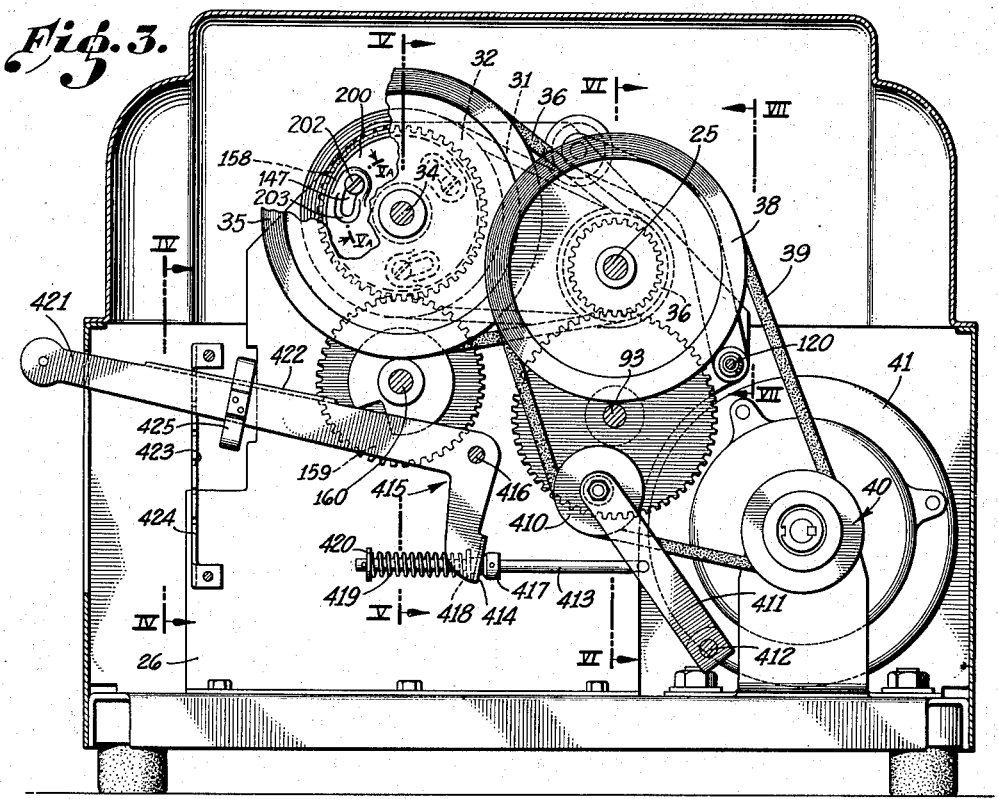
Fig. 3 is a vertical section taken in the plane III—III of Fig. 2.

As noted hereinabove, pulley 32 (Figure 3) is connected by a belt 31 to conveyer driving pulley 30 (Figure 6) so that when clutch 29 is engaged the conveyer system is driven. Pulley 32, however, being driven by shaft 34 (Figure 5) is accordingly driven with motor coupling 155 when clutch 150 is engaged. As noted above, it is necessary to time the meter and conveyer drives, and to this end pulley 32 is of the variable diameter type and comprises two sheet metal sections 200 and 201 which are adjustable axially with respect to one another to vary the effective diameter of the pulley. Section 201 is rigidly secured to the pulley hub, whereas pulley section 200 is slidably mounted on the hub and is secured to section 201 by three bolts 202 (Figure 3). These bolts extend through slots 147 (Figure 5a) formed in small areas 203 of the pulley sections, which areas are pressed at an angle to the main bodies of sections 200 and 201. Thus by loosening bolts 202 and rotating the free pulley section 200 with respect to the other section 201, the sections can be moved relative to one another and accordingly can be separated as desired and secured in such separated position by retightening bolts 202. In this manner the effective diameter of the pulley is varied within its limits of adjustment, and this variation in diameter may be utilized to time the printing head of the meter to the conveying system.

There is fixed to the shaft 154 (Figure 2) a gear 158 which meshes with a gear 159 of the same size on a shaft 160, which is positioned below the shaft 154 and supported in journals 161 and 162. At its forward end, the shaft 160 is connected, by a universal coupling 163, to the rear end of a shaft 164, which is connected at its forward end, by another universal coupling 165, to the rear end of the platen shaft 140. It will be apparent, therefore, that the printing head and platen must rotate at the same speed, but in opposite directions, and they are rotated whenever the clutch 150 is engaged. This clutch 150 is controlled by the trigger 57 (Figure 1), previously referred to in connection with the conveyor mechanism for feeding letters. The trigger is connected to the clutch 150 by a mechanism described and claimed in our copending application Serial No. 399,324, filed June 23, 1941. This linkage is not shown in the present drawings, because it would considerably complicate it.

Although for the purpose of explaining the invention a particular embodiment thereof has been described in detail, it is to be understood that various departures from the particular construction described may be made without departing from the invention, and the invention is to be limited only as set forth in the appended claims.

We claim:

1. A mail treating machine comprising printing means for stamping postage on mail and including a rotary printing head member and a cooperating rotary platen member, one at least of said members having a cutaway portion, means coupling said printing head and platen for simultaneous rotation out of a neutral position, in which said cutaway portion on said one member is juxtaposed to the other member, and through a printing cycle back into neutral position, means for driving said printing head and platen, means for feeding mail through said printing means including conveyer means juxtaposed to said printing head but independent of said platen, and means operable independently of said first-mentioned driving means for driving said feeding means, whereby the latter is operative to feed mail past said printing head and platen while they remain in neutral position.

2. A machine as described in claim 1, in which said printing head is wider than said platen and includes a printing section juxtaposed to said platen and a non-printing section axially spaced from said printing section and juxtaposed to said conveyer means.

3. A machine as described in claim 1, in which said conveyer means comprises a conveyer belt, and means yieldably pressing said belt toward said printing head member.

4. A machine as described in claim 1, in which said conveyer means comprises a conveyer belt, first pulley means for supporting and driving said belt with one reach thereof adjacent to said printing head, a pair of idler pulleys for pressing said one reach of said belt toward said printing head, one pulley being positioned in front and one positioned in back of the plane through the axis of the printing head and platen, and means yieldably urging said idler pulleys toward said printing head.

5. A machine as described in claim 1, in which said conveyer means comprises a conveyer belt, first pulley means for supporting and driving said belt with one reach thereof adjacent to said printing head, a pair of idler pulleys for pressing said one reach of said belt toward said printing head, one pulley being positioned in front and one being positioned in back of the plane through the axis of the printing head and platen, a supporting arm for each of said idler pulleys, means pivotally supporting the opposite end of each arm for rocking movement to carry the associated pulley toward said printing head, spring means for urging said arm toward said printing head, and adjustable stop means for limiting the extent of movement of said pulleys toward said printing head.

6. A mail treating machine having a treating mechanism for receiving, treating and discharging mail delivered thereto, first conveyer means for delivering mail to said treating mechanism, an ejector roller beyond said treating mechanism for receiving mail discharged therefrom and ejecting it from the machine, a conveyer belt for feeding mail through said treating mechanism, a driving pulley on said ejector roller for said conveyer belt, driving means, means coupling said driving means to said first conveyer means, means coupling said driving means to said ejector roller, and separate means for driving said treating mechanism.

7. A machine as described in claim 6, in which said means for coupling said driving means to said ejector roller includes a second pulley on said ejector roller, and a belt for driving said second pulley, said two pulleys being simultaneously and inversely variable as to diameter, whereby the speed of said conveyer belt is adjustable relative to the speed of said first conveyer means.

8. A machine as described in claim 6, in which said driving pulley for said conveyer belt is of smaller diameter than said ejector roller, whereby the peripheral speed of the ejector roller is greater than the linear speed of said belt conveyer.

9. A machine as described in claim 1, in which said means for feeding mail includes conveyer means ahead of said printing head for delivering mail to the printing head, and a belt conveyer juxtaposed to said printing head for pressing mail against said printing head, and adjustable speed transmission means coupling said conveyer means to said conveyer belt, whereby the linear speed of said conveyer belt can be accurately adjusted with respect to the peripheral speed of said printing head.

10. A machine as described in claim 1, in which said conveyer means juxtaposed to said printing head comprises a belt, and means for moving it in the same direction as the adjacent portion of the printing head, said printing head having a pressure roller thereon for contacting said belt when the printing head is in neutral position, and means for pressing said belt against said auxiliary roller comprising a pair of pressure rollers bearing against the opposite side of said belt from said auxiliary roller and positioned one in front of and one in back of said auxiliary roller.

11. A mail treating machine comprising a rotary printing head and a cooperating rotary platen with means for driving them simultaneously to engage and print on mail passing therebetween, said platen being movably supported for movement toward and away from the printing head, and relatively stiff spring means urging said platen toward said printing head with substantial force to produce a heavy printing pressure on envelopes therebetween, said printing platen having a recessed portion juxtaposed to said printing head in neutral position, auxiliary conveyer means for moving mail between said printing head and platen while they are in neutral position, said auxiliary conveyer means including a mail-contacting belt juxtaposed to a portion of said printing head, and relatively light spring means urging said belt toward said printing head for engaging mail with light pressure and moving it between said printing head and platen when the latter are inactive.

12. A mail treating machine comprising printing means including a rotary printing head and a cooperating rotary platen, power-operated means for feeding mail to and from said printing head and platen, means movable into and out of tape supplying position for supplying tape to said printing head and platen, a driving means, means for independently coupling said feeding means and said printing means to said driving means, and means operated by said tape supplying means upon movement thereof into tape supplying position for disconnecting said feeding means from said driving means, whereby said printing means is operable to print on tape without operation of said feeding means.

13. A mail treating machine for receiving, treating and discharging mail delivered thereto, said machine comprising, in combination, a conveying system for receiving and discharging mail delivered thereto, a printing member operatively associated with said conveying system for printing on mail being conveyed, means for rotating said printing member, means forming a driving connection between said driving means and conveyer system, and means for timing said driving connection with respect to said driving means so that said conveyer system conveys mail at a linear velocity equal to the peripheral velocity of said printing member.

14. A mail treating machine for receiving, treating and discharging mail delivered thereto, said machine comprising, in combination, a conveyer system for receiving and discharging mail delivered thereto, a printing member operatively associated with said conveyer system for printing on mail being conveyed, a shaft for rotating said printing member, a pulley on said shaft, means including a belt forming a driving connection between said pulley and said conveying system, and means for varying the diameter of said pulley to time said conveyer system to said printing member so that said conveyer system conveys mail at a linear velocity equal to the peripheral velocity of said printing member.

15. In a mail treating machine wherein envelopes or the like are individually fed from a hopper to a printing member and thence ejected from the machine, the combination of, a feeding device for feeding envelopes from the hopper, a conveying device for conveying the envelopes fed from the hopper toward the printing position, a conveyor mechanism for receiving the envelopes from said conveying device and carrying them to and through the printing position, a platen adjacent said conveyor mechanism and operatively associated with the printing member, driving means, means coupling said driving means to said platen, means independently coupling said driving means to said feeding means, said conveying device and said conveyor mechanism, means movable into and out of tape supplying position for supplying tape to said printing head and platen, and means operated by said tape supplying means upon movement thereof into tape supplying position for disconnecting said feeding means, said conveying device and said conveyor mechanism from said driving means, whereby said printing means is operable to print on tape without operation of said feeding means, said conveying device and said conveyor mechanism.

16. In a mail treating machine wherein envelopes or the like are individually fed from a hopper to a printing member and thence ejected from the machine, the combination of, a feeding device for feeding envelopes from the hopper, a conveying device for conveying the envelopes fed from the hopper toward the printing position, a conveyor mechanism for receiving the envelopes from said conveying device and carrying them to and through the printing position, a platen adjacent said conveyor mechanism and operatively associated with the printing member, driving means, means coupling said driving means to said platen, means independently coupling said driving means to said feeding means, said conveying device and said conveyor mechanism, means movable into and out of tape supplying position for supplying tape to said printing head and platen, means operated by said tape supplying means upon movement thereof into tape supplying position for disconnecting said feeding means, said conveying device and said conveyor mechanism from said driving means, whereby said printing means is operable to print on tape without operation of said feeding means, said conveying device and said conveyor mechanism, and timing means associated with said conveyor mechanism for adjusting the operative speed thereof to the speed of operation of said printing member.

17. In a mail treating machine, in combination, a rotary printing member, a rotatable platen juxtaposed to said printing member and rotatable about an axis parallel to but spaced from the axis of said printing member, means for rotating said printing member and platen in unison, a heavy spring for forcing said platen toward said printing member, means including a conveyor belt for conveying mail matter to a printing position between said printing member and said platen, said conveyor belt being spaced laterally from said platen, means including a light spring for biasing said conveyor belt toward said printing member, and means forming a driving connection between said driving means and said conveyor belt.

18. In a mail treating machine, in combination, a rotary printing member, a rotatable platen juxtaposed to said printing member and rotatable about an axis parallel to but spaced from the axis of said printing member, means for rotating said printing member and platen in unison, a heavy spring for forcing said platen toward said printing member, means including a conveyor belt for conveying mail matter to a printing position between said printing member and said platen, said conveyor belt being spaced laterally from said platen, means including a light spring for biasing said conveyor belt toward said printing member, and means including a clutch forming a driving connection between said driving means and said conveyor belt, whereby said printing member and said platen as an operative unit and said conveyor belt may be operated independently of one another.

19. In a mail treating machine, in combination, a rotatable printing member, a rotatable platen juxtaposed to said printing member and adapted to force mail matter thereagainst during a printing cycle, means for rotating said printing member and said platen in unison, said platen having a cut away portion juxtaposed to said printing member so as to provide a space therebetween when said printing member and said platen are in a position of rest, a roller rotatably mounted on said printing member and spaced laterally of said platen, conveying means including a belt laterally spaced from said platen, one reach of said belt being adapted to bear against said roller when said printing member is in its rest position, and means for driving said belt to convey mail matter between said printing member and said platen when they are in their rest position.

20. In a mail treating machine, in combination, a rotatable printing member, a rotatable platen juxtaposed to said printing member and adapted to force mail matter thereagainst during a printing cycle, means for rotating said printing member and said platen in unison, said platen having a cut away portion juxtaposed to said printing member so as to provide a space therebetween when said printing member and said platen are in a position of rest, a roller rotatably mounted on said printing member and spaced laterally of said platen, conveying means including a belt laterally spaced from said platen, one reach of said belt being adapted to bear against said roller when said printing member is in its rest position, means for driving said belt to convey mail matter between said printing member and said platen when they are in their rest position, and idler means for forcing said belt against said roller.

21. A machine as described in claim 1, in which said conveyor means includes a conveyor belt, means for pressing one reach of said belt toward said printing head, and rotatable means on said printing head adapted to be engaged and rotated by said belt, whereby said belt and said rotatable means may feed mail matter past said printing head when said head is stationary.

COMMODORE D. RYAN.
EDWARD P. DRAKE.

Certificate of Correction

Patent No. 2,377,522.   June 5, 1945.

COMMODORE D. RYAN ET AL.

It is hereby certified that errors appear in the printed specification of the above numbered patent requiring correction as follows: Page 8, first column, line 67, claim 17, and second column, line 10, claim 18, after the comma and before "means" insert *driving*; and that the said Letters Patent should be read with these corrections therein that the same may conform to the record of the case in the Patent Office.

Signed and sealed this 2d day of December, A. D. 1947.

[SEAL]

THOMAS F. MURPHY,
*Assistant Commissioner of Patents.*